UNITED STATES PATENT OFFICE.

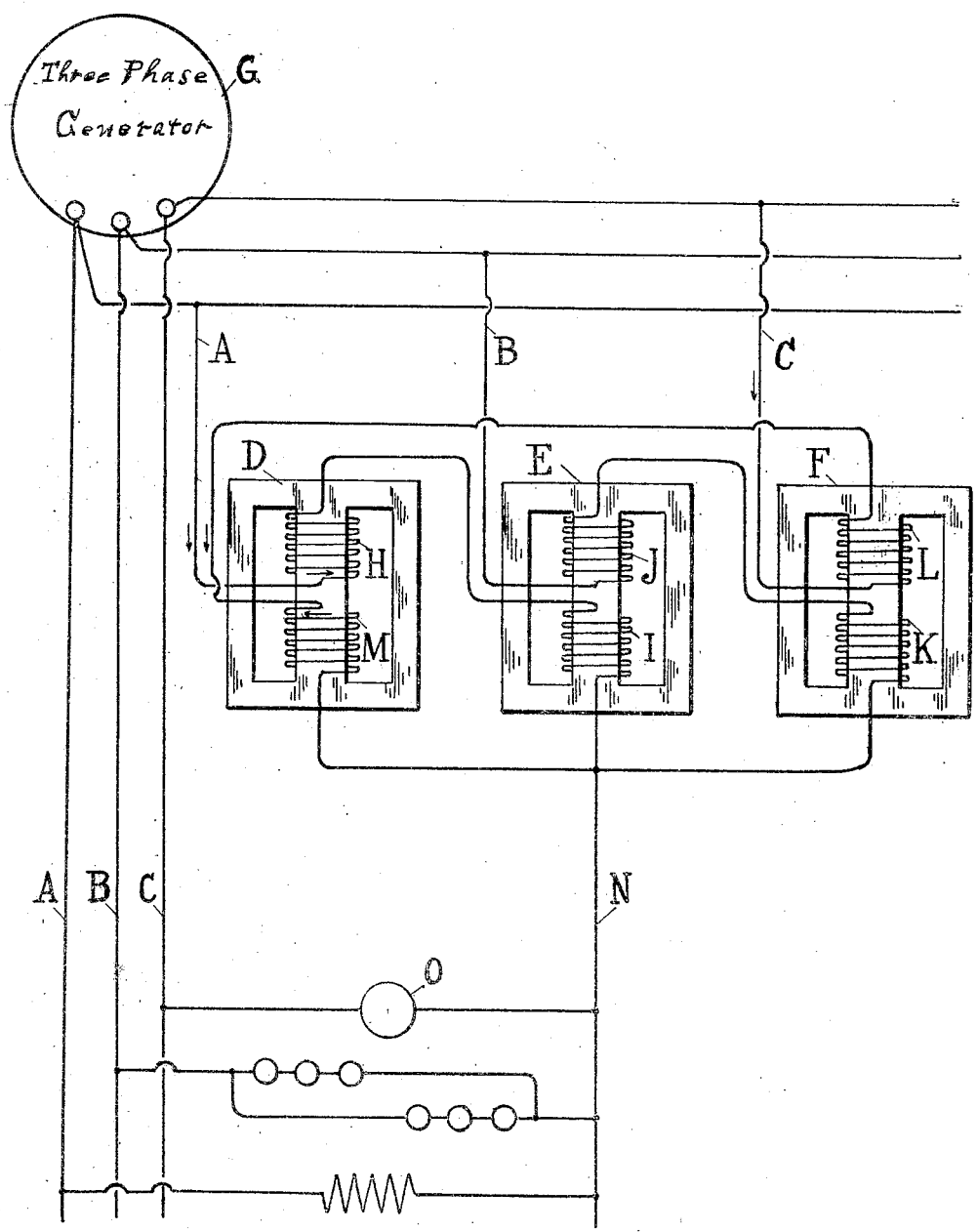

ARMIN HENRY PIKLER, OF MONTCLAIR, NEW JERSEY, ASSIGNOR TO CROCKER-WHEELER COMPANY, OF AMPERE, NEW JERSEY, A CORPORATION OF NEW JERSEY.

BALANCER FOR THREE-PHASE ELECTRICAL SYSTEMS.

1,057,772.

Specification of Letters Patent. Patented Apr. 1, 1913.

Application filed November 29, 1911. Serial No. 663,057.

*To all whom it may concern:*

Be it known that I, ARMIN HENRY PIKLER, a subject of the King of Hungary, and a resident of Montclair, county of Essex, and State of New Jersey, have invented certain new and useful Improvements in Balancers for Three-Phase Electrical Systems, of which the following is a specification.

The object of this invention is to provide means in a three-phase electrical system of distribution for establishing a neutral conductor at the point of current consumption when by reason of the construction of the generator or its remoteness, it is not practicable or desirable to lead the neutral conductor directly therefrom. A neutral so established enables lamps and other single phase apparatus for consuming current which require a lower voltage than exists between the main leads to be connected to the three-phase system and take care of any unbalance arising from the consumption of an excess of current from either of the main leads. There are various other uses of a balanced neutral so established which are not enumerated herein.

In the accompanying sheet of drawings which forms a part of this application, the figure illustrates a three-phase system with three transformers for establishing a neutral in accordance with my invention.

A three-phase generator G supplies three-phase conductors A B C. Branches from these conductors are led to windings on three transformer cores D E F which preferably form three independent closed magnetic circuits, and thence joined to form a neutral conductor N. Each of the windings of each phase is subdivided into two halves, each having the same number of turns. In the drawing H M and J I and L K respectively illustrate coils per phase corresponding to this requirement. The branch from conductor A is through a coil H on core D and thence through a coil I on core E to the neutral conductor. The branch from conductor B is through a coil J on core E and thence through a coil K on core F to the neutral conductor. The branch from conductor C is through a coil L on core F and thence through a coil M on core D to the neutral conductor. The connections to the transformer coils are such that if the current be traced through the two coils in any transformer from the generator conductors which supply the two coils to the neutral conductor the directions of the windings will be opposite. Thus in the transformer D the direction from the generator conductor A through the coil H to the neutral is opposite to the direction from the conductor C through the coil M to the neutral conductor as shown by the arrows. Between the neutral N thus established and any or all of the other three conductors A, B and C of the system, lamps or other devices may be connected, forming a four-wire, three-phase distribution as indicated in the drawing. The loads so connected to the different phases may be equal or unequal, and any tendency to unbalance of their voltages is counteracted by the operation of my apparatus, because the two halves of the winding of each phase are interlinked with two different magnetic circuits; also because each magnetic circuit is interlinked with coils belonging to two different phases. At the same time the linkages of each phase and of each magnetic circuit are different from those of any other.

It would naturally be supposed that it is necessary to subdivide each winding of three-phase transformers into three parts and distribute them on the three magnetic circuits in order to obtain a proper balancing of the voltages with unequal loads on the different phases. I have discovered, however, and proved by actual experiments that it is sufficient to have two coils for each of the three-phase windings, provided they are arranged in accordance with my invention.

What I claim as new and desire to secure by Letters Patent of the United States, is—

1. The combination with three-phase conductors, of three transformer cores, a branch from each of the three-phase conductors having therein two coils in series on different transformer cores, the pair of coils in each branch being on a different pair of transformer cores from the pair of coils in either of the other branches, and a neutral conductor to which each of the branch conductors is connected through its coils, substantially as described.

2. The combination with three-phase conductors, of three transformer cores forming three independent magnetic circuits, a branch from each of the three-phase conductors having therein two coils in series on different transformer cores, the pair of coils in each branch being on a different pair of transformer cores from the pair of coils in either of the other branches, and a neutral conductor to which each of the branch conductors is connected through its coils, substantially as described.

3. The combination with three-phase conductors, of three transformer cores, a branch from each of the three-phase conductors having therein two coils in series on different transformer cores, the pair of coils in each branch being on a different pair of transformer cores from the pair of coils in either of the other branches, and a neutral conductor to which each of the branch conductors is connected through its coils, the directions of windings of the two coils on each transformer core traced from their respective generator connections to the neutral conductor being opposite, substantially as described.

4. The combination with three-phase conductors, of three transformer cores forming three independent magnetic circuits, a branch from each of the three-phase conductors having therein two coils in series on different transformer cores, the pair of coils in each branch being on a different pair of transformer cores from the pair of coils in either of the other branches, and a neutral conductor to which each of the branch conductors is connected through its coils, the directions of windings of the two coils on each transformer core traced from their respective generator connections to the neutral conductor being opposite, substantially as described.

5. The combination with three-phase conductors, of three magnetic circuits and three windings connected to said conductors, each winding comprising two portions interlinked with two different magnetic circuits and each magnetic circuit being interlinked with portions of two different windings, the linkages of each magnetic circuit and of each winding being different from those of any other, whereby a balancing of the voltages of the phases is obtained.

6. The combination with three-phase conductors, of three magnetic circuits and a winding connected to each of the three-phase conductors comprising two coils in series on different magnetic circuits, the two coils of each winding being on a different pair of magnetic circuits from the two coils of either of the other windings.

Signed by me at East Orange, N. J., the 24th day of November, 1911.

ARMIN HENRY PIKLER.

Witnesses:
 GEORGE K. KAISER,
 CHARLES L. PILGER, Jr.